United States Patent
Tseng et al.

(10) Patent No.: US 12,359,692 B2
(45) Date of Patent: Jul. 15, 2025

(54) SLIDE RAIL ASSEMBLY

(71) Applicant: PEGATRON CORPORATION, Taipei (TW)

(72) Inventors: Yi-Ching Tseng, Taipei (TW); Chih-Wei Yu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 215 days.

(21) Appl. No.: 18/447,227

(22) Filed: Aug. 9, 2023

(65) Prior Publication Data

US 2024/0117840 A1 Apr. 11, 2024

Related U.S. Application Data

(60) Provisional application No. 63/413,253, filed on Oct. 5, 2022.

(30) Foreign Application Priority Data

Dec. 23, 2022 (TW) .................................. 111149595

(51) Int. Cl.
*F16C 29/10* (2006.01)
*A47B 88/427* (2017.01)

(52) U.S. Cl.
CPC ............ *F16C 29/10* (2013.01); *A47B 88/427* (2017.01)

(58) Field of Classification Search
CPC ........ F16C 29/10; F16C 29/005; F16C 29/02; F16C 2370/00; F16C 29/004; A47B 88/427; H05K 7/18; H05K 5/02
See application file for complete search history.

(56) References Cited

U.S. PATENT DOCUMENTS

| 6,209,979 | B1 * | 4/2001 | Fall ...................... | H05K 7/1489 |
| | | | | 312/319.1 |
| 6,601,933 | B1 * | 8/2003 | Greenwald ............ | A47B 88/49 |
| | | | | 312/334.46 |
| 6,938,967 | B2 * | 9/2005 | Dubon ................. | H05K 7/1489 |
| | | | | 312/334.44 |

(Continued)

FOREIGN PATENT DOCUMENTS

| CN | 100471420 C | * | 3/2009 | |
| DE | 202005017900 U1 | * | 3/2006 | ........... A47B 88/427 |

(Continued)

*Primary Examiner* — Hanh V Tran
(74) *Attorney, Agent, or Firm* — J.C. PATENTS

(57) ABSTRACT

A slide rail assembly adapted to dispose to a first casing is provided. The slide rail assembly includes an outer slide rail, an inner slide rail, and first and second engaging components. The outer slide rail includes a first hook. The inner slide rail is slidably disposed to the outer slide rail and includes first and second ends and positioning slots. First fixing portions of the first casing is engaged with several of the positioning slots. The first engaging component is partially overlapped with a critical positioning slot of the positioning slots and includes a second hook. The second engaging component includes a third hook. When the first casing is set on the inner slide rail, the second hook leaves an engaging path with the first hook, and the first casing and the inner slide rail slide to a position where the third hook is engaged with the first hook.

10 Claims, 11 Drawing Sheets

(56) References Cited

U.S. PATENT DOCUMENTS

| | | | | |
|---|---|---|---|---|
| 7,513,581 B1 * | 4/2009 | Baiza | .................... | A47B 88/427 |
| | | | | 312/319.1 |
| 7,850,369 B2 * | 12/2010 | Young | ................... | A47B 88/427 |
| | | | | 312/348.1 |
| 8,366,217 B1 * | 2/2013 | Chen | .................... | H05K 7/1489 |
| | | | | 312/333 |
| 8,528,999 B2 * | 9/2013 | Chen | .................... | H05K 7/1489 |
| | | | | 312/334.45 |
| 8,879,271 B2 * | 11/2014 | Fan | ..................... | H05K 7/1489 |
| | | | | 361/679.33 |
| 9,198,323 B1 * | 11/2015 | Chen | ....................... | F16C 29/04 |
| 9,557,782 B2 * | 1/2017 | Hsu | ........................ | G06F 1/187 |
| 9,642,279 B2 * | 5/2017 | Chen | .................... | A47B 88/427 |
| 9,668,577 B2 * | 6/2017 | Chen | .................... | A47B 96/067 |
| 10,117,352 B2 * | 10/2018 | Chen | ....................... | A47B 88/43 |
| 10,154,731 B2 * | 12/2018 | Chen | .................... | A47B 88/487 |
| 10,646,038 B2 * | 5/2020 | Chen | .................... | H05K 7/1489 |
| 10,791,834 B2 * | 10/2020 | Chen | ...................... | A47B 88/57 |
| 2012/0063709 A1 * | 3/2012 | Chen | .................... | F16C 29/005 |
| | | | | 384/26 |

FOREIGN PATENT DOCUMENTS

| | | | | |
|---|---|---|---|---|
| EP | 3197252 B1 * | 4/2020 | ........... | A47B 88/427 |
| JP | 3180814 U * | 1/2013 | ........... | A47B 88/427 |
| TW | 1409025 B * | 9/2013 | | |
| TW | 201836459 | 10/2018 | | |

* cited by examiner

SLIDE RAIL ASSEMBLY

CROSS-REFERENCE TO RELATED APPLICATION

This application claims the priority benefit of the U.S. provisional application Ser. No. 63/413,253, filed on Oct. 5, 2022, and Taiwan application serial no. 111149595, filed on Dec. 23, 2022. The entirety of the above-mentioned patent application is hereby incorporated by reference herein and made a part of this specification.

BACKGROUND

Technical Field

The disclosure relates to a slide rail assembly, and particularly relates to a slide rail assembly that matches various sizes of casings.

Description of Related Art

Today's slide rail assembly is a single-segment slide rail assembly having a single slidable length. When the single-segment slide rail assembly is installed on casings of different sizes, it is required to select the single-segment slide rail assembly with the corresponding slidable length according to the size of the casing, resulting in increased material preparation and storage costs.

SUMMARY

The disclosure is directed to a slide rail assembly, which has different sliding lengths according to different casing sizes, so as to improve the convenience of using the slide rail assembly and reduce cost.

The disclosure provides a slide rail assembly adapted to be disposed on a first side surface of a first casing. The first side surface of the first casing is configured with a plurality of first fixing portions. The slide rail assembly includes an outer slide rail, an inner slide rail, a first engaging component and a second engaging component. The outer slide rail includes a first hook. The inner slide rail is slidably disposed on the outer slide rail along a sliding direction, and includes a first end, a second end and a plurality of positioning slots located between the first end and the second end. The first fixing portions are adapted to be engaged with a corresponding number of the positioning slots, so that the first casing is fixed to the inner slide rail. The first engaging component is movably disposed on the inner slide rail, and is partially overlapped with a critical positioning slot closest to the second end in the positioning slots, and the first engaging component includes a second hook. The second engaging component is movably disposed on the inner slide rail and is close to the second end, and the second engaging component includes a third hook. When the first casing is assembled on the inner slide rail, one of the first fixing portions of the first casing that is aligned with the critical positioning slot pushes against the first engaging component, so that the second hook leaves an engaging path with the first hook, and the first casing and the inner slide rail are adapted to slide relative to the outer slide rail to a position where the third hook is engaged with the first hook.

Based on the above description, the slide rail assembly of the disclosure may make the second hook of the first engaging component to automatically misalign with the first hook through the critical positioning slot of the inner slide rail and the structural interference between the first engaging component and the first fixing portion of the first casing, so that the first hook is engaged with the third hook, and the first casing and the inner slide rail may have a longer sliding stroke. In addition, when the slide rail assembly is disposed on a shorter casing, the second hook is aligned with the first hook so that the first hook engages with the second hook. At this time, the short casing and the inner slide rail may have a shorter sliding stroke. Therefore, the slide rail assembly is suitable for casings of various sizes, and the inner slide rail may have different sliding lengths according to different casing sizes, so as to improve usage convenience of the slide rail assembly and reduce the cost.

DESCRIPTION OF THE EMBODIMENTS

Figure 1:
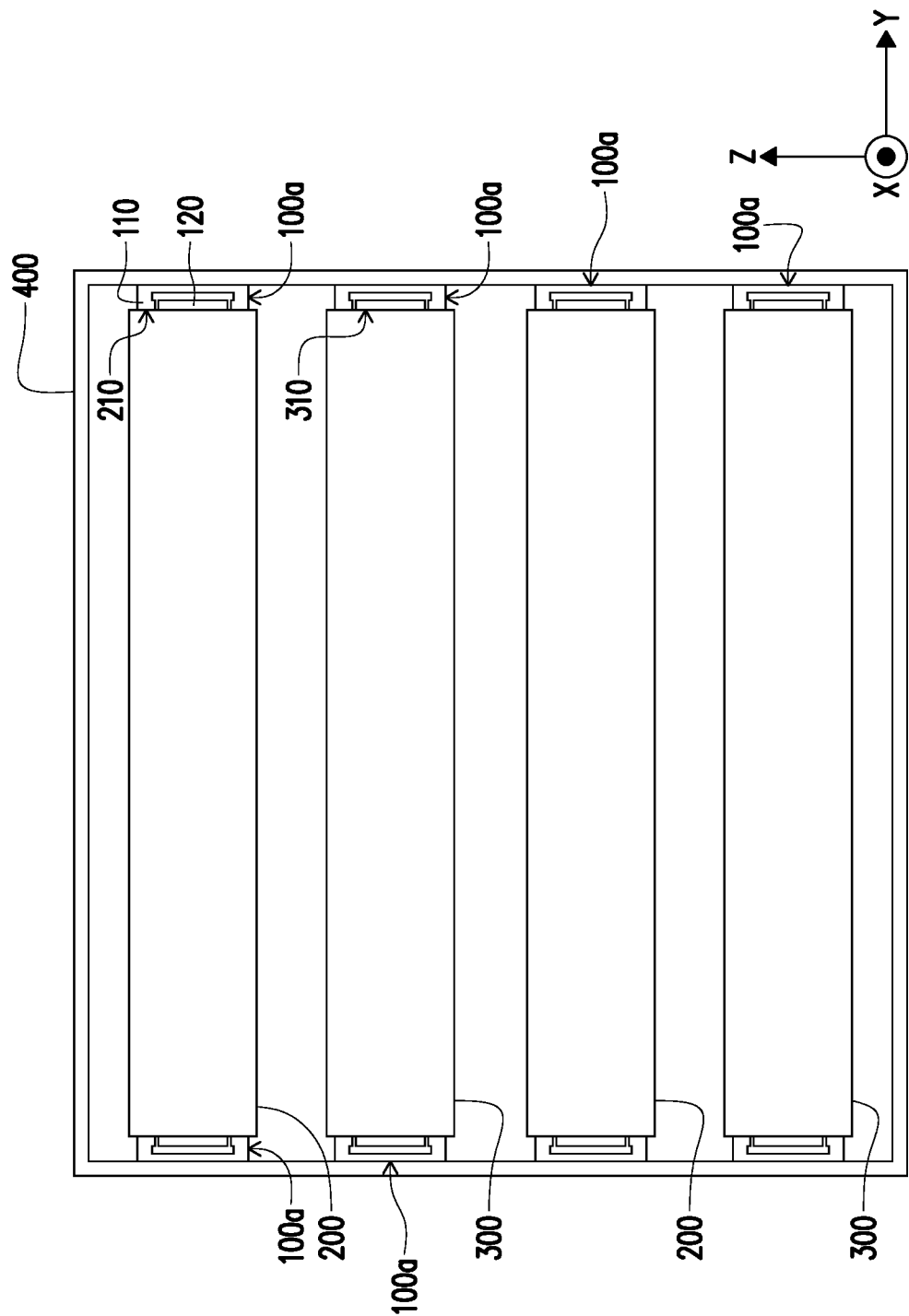
FIG. 1 is a schematic diagram of a slide rail assembly in a chassis according to an embodiment of the disclosure.

FIG. 1 is a schematic diagram of a slide rail assembly in a chassis according to an embodiment of the disclosure. Cartesian coordinates X-Y-Z are provided here to facilitate component description. Referring to FIG. 1, a plurality of first casings 200 and a plurality of second casings 300 may be accommodated in a chassis 400. Two side surfaces of the first casing 200 are respectively provided with a slide rail assembly 100a, so that the first casing 200 may slide into or out of the chassis 400 along a sliding direction (i.e., an X-axis direction). Similarly, two side surfaces of the second casing 300 are respectively provided with one slide rail assembly 100a, so that the second casing 300 may slide relative to the chassis 400. The first casings 200 and the second casings 300 are, for example, server casings, but the disclosure is not limited thereto.

Figure 2:
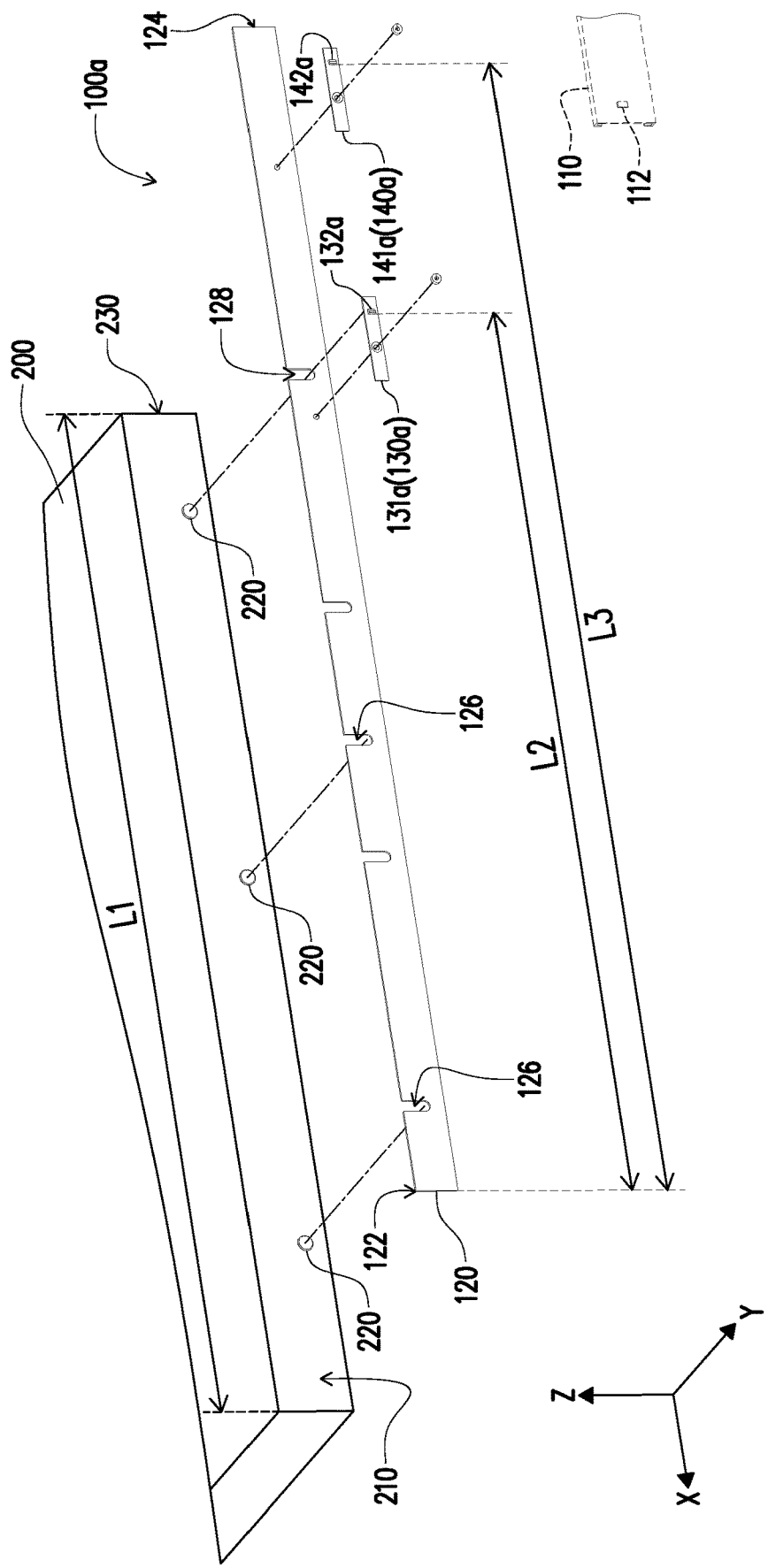
FIG. 2 is a schematic diagram before the slide rail assembly of FIG. 1 is assembled with a first casing.
Figure 3:
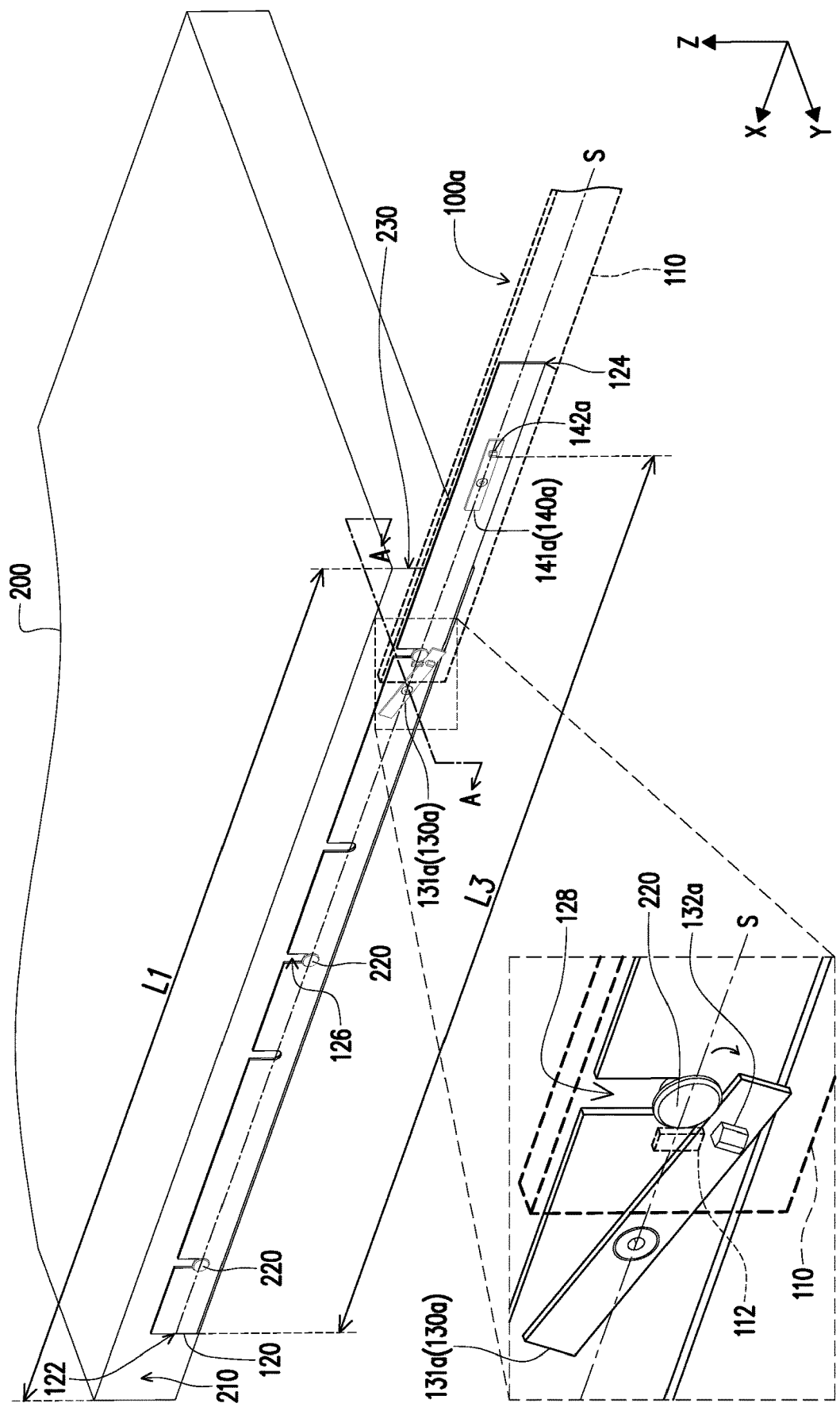
FIG. 3 is a schematic diagram after the slide rail assembly of FIG. 2 is assembled with the first casing.
Figure 4:
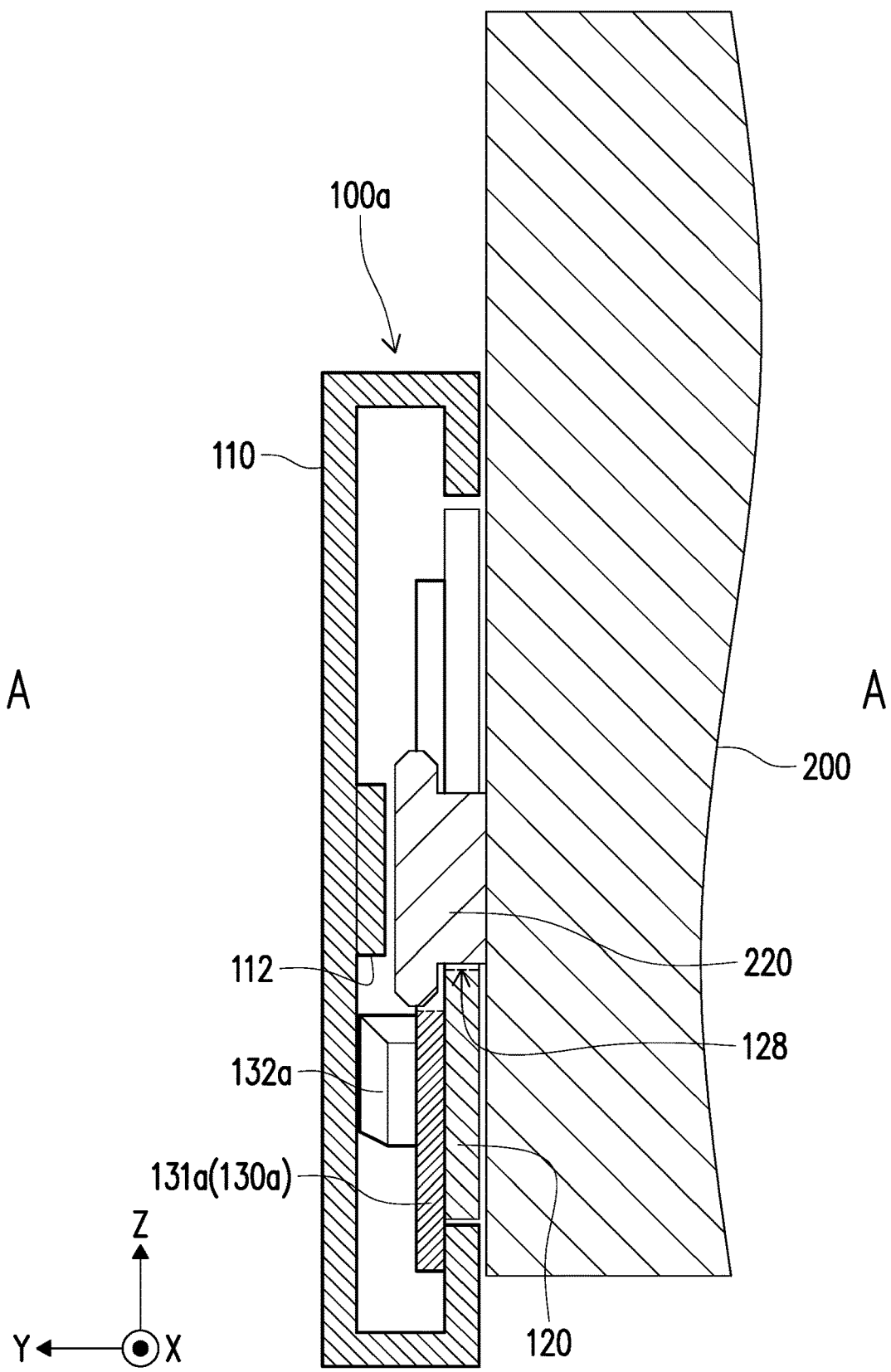
FIG. 4 is a cross-sectional view of the slide rail assembly and the first casing of FIG. 3 along a line A-A.

FIG. 2 is a schematic diagram before the slide rail assembly of FIG. 1 is assembled with the first casing. FIG. 3 is a schematic diagram after the slide rail assembly of FIG. 2 is assembled with the first casing. FIG. 4 is a cross-sectional view of the slide rail assembly and the first casing of FIG. 3 along a line A-A, and the cross section is a straight cross section parallel to a Y-Z plane. An outer slide rail 110 in FIG. 2 and FIG. 3 is presented in a perspective manner.

Referring to FIG. 2 to FIG. 4, the slide rail assembly 100a includes an outer slide rail 110, an inner slide rail 120, a first engaging component 130a and a second engaging component 140a. The outer slide rail 110 may be disposed on the chassis 400 (FIG. 1) and includes a first hook 112. The inner slide rail 120 is slidably disposed on the outer slide rail 110 along the sliding direction (an X-axis direction), and includes a first end 122, a second end 124 and a plurality of positioning slots 126 located between the first end 122 and the second end 124. The first engaging component 130a and the second engaging component 140a are movably disposed on the inner slide rail 120.

As shown in FIG. 2, the first engaging component 130a of the embodiment includes a first main body 131a and a second hook 132a disposed on the first main body 131a. The second engaging component 140a includes a second main body 141a and a third hook 142a disposed on the second main body 141a.

The first main body 131a of the first engaging component 130a is pivotally connected to the inner slide rail 120, and the second main body 141a of the second engaging component 140a is pivotally connected to the inner slide rail 120. The first engaging component 130a is partially overlapped with the positioning slot 126. The second engaging component 140a is close to the second end 124.

A first side surface 210 of the first casing 200 is configured with a plurality of first fixing portions 220. A length L1 of the first casing 200 in the sliding direction (X-axis) is greater than a distance L2 between the first end 122 and the second hook 132a of the first engaging component 130a, and is smaller than a distance L3 between the first end 122 and the third hook 142a of the second engaging component 140a. Therefore, when the first casing 200 is assembled on the slide rail assembly 100a, a projection of an end 230 of the first casing 200 in the sliding direction (X-axis) on the inner sliding rail 120 is located between a projection of the first engaging component 130a on the inner slide rail 120 and a projection of the second engaging component 140a on the inner slide rail 120.

As shown in FIG. 3, when the first casing 200 is fixed on the inner slide rail 120, the first fixing portions 220 may be engaged with a corresponding number of the positioning slots 126, so that the first casing 200 is fixed on the inner slide rail 120. One of the positioning slots 126 closest to the second end 124 (i.e., the positioning slot 126 partially overlapped with the first engaging component 130a) is a critical positioning slot 128. One first fixing portion 220 of the first casing 200 may be engaged with the critical positioning slot 128.

Since the first engaging component 130a is partially overlapped with the critical positioning slot 128, when the first casing 200 is fixed on the inner slide rail 120, the first fixing portion 220 aligned with the critical positioning slot 128 moves into the critical positioning slot 128 and pushes against the first engaging component 130a. The first main body 131a of the first engaging component 130a may be pushed by the first fixing portion 220 to pivotally rotate relative to the inner slide rail 120 to a position as shown in an enlarged view of FIG. 3.

As shown in the enlarged view of FIG. 3, the second hook 132a is misaligned with the first hook 112 and leaves an engaging path S with the first hook 112. The engaging path S is parallel to the sliding direction (X-axis). As shown in FIG. 4, the second hook 132a is located below the first hook 112 in a Z-axis direction, and the first fixing portion 220 does not contact the first hook 112. The third hook 142a of the second engaging component 140a is located on the engaging path S with the first hook 112.

When the first casing 200 and the inner slide rail 120 slides out of the chassis 400 (FIG. 1) along the sliding direction (i.e., +X-axis direction) and moves to the position shown in FIG. 3, the second hook 132a does not engage with the first hook 112. The first casing 200 and the inner slide rail 120 may continually slide relative to the outer slide rail 110 until the first casing 200 and the inner slide rail 120 slide to a position where the third hook 142a of the second engaging component 140a is engaged with the first hook 112. In the embodiment, the third hook 142a may limit a sliding stroke of the first casing 200 and the inner slide rail 120 along the sliding direction (X-axis). A length of the sliding stroke may be equal to the distance L3.

Since the length L1 of the first casing 200 is smaller than the distance L3 (FIG. 3), when the third hook 142a engages with the first hook 112, the first casing 200 may completely slide out of the chassis 400 (FIG. 1) to facilitate replacement or maintenance.

When the first casing 200 and the inner slide rail 120 are to be completely taken out from the casing 400 (FIG. 1), the second main body 141a of the second engaging component 140a may be rotated to drive the third hook 142a to leave the engaging path S with the first hook 112, so that the inner slide rail 120 may be detached from the outer slide rail 110. The first casing 200 is completely separated from the chassis 400.

It is learned that, through the structural interference between the first fixing portion 220 of the first casing 200 and the first engaging component 130a, the first engaging component 130a may be automatically rotated to make the second hook 132a to be misaligned with the first hook 112. The first engaging component 130a will not affect the sliding of the first casing 200 and the inner slide rail 120. Therefore, the user only needs to push and pull the first casing 200 to slide the first casing 200 into or out of the chassis 400 (FIG. 1).

Figure 5:
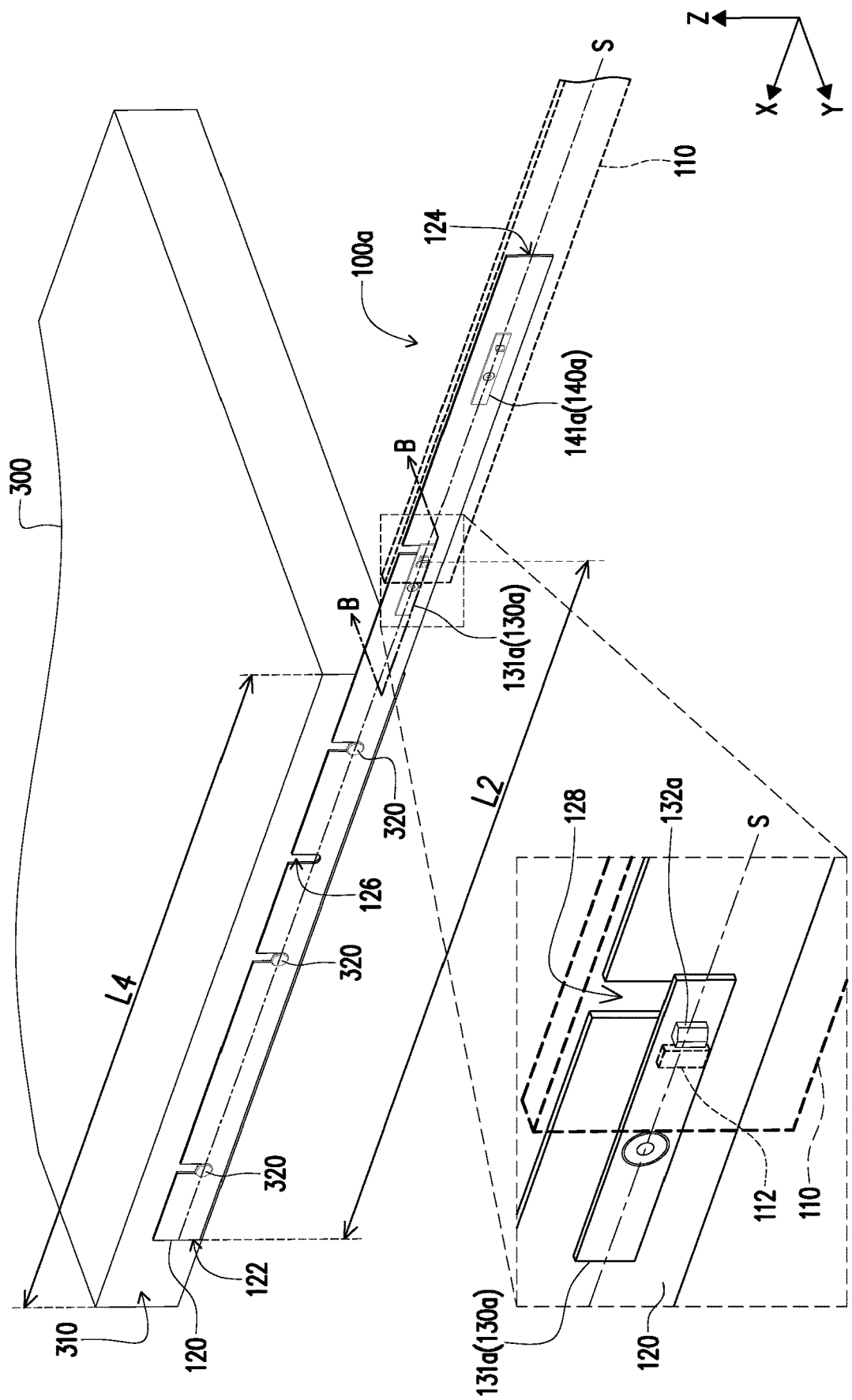
FIG. 5 is a schematic diagram after the slide rail assembly of FIG. 1 and a second casing are assembled.
Figure 6:
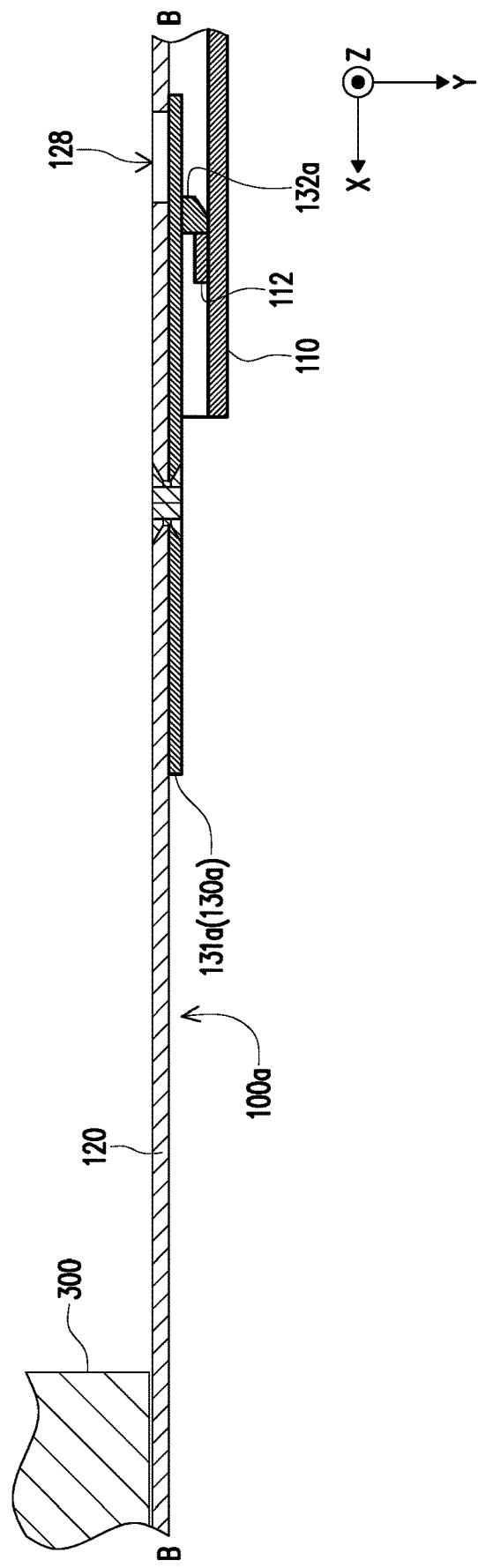
FIG. 6 is a cross-sectional view of the slide rail assembly and the second casing in FIG. along a line B-B.

FIG. 5 is a schematic diagram after the slide rail assembly of FIG. 1 and the second casing are assembled, and the outer slide rail 110 is presented in a perspective manner. FIG. 6 is a cross-sectional view of the slide rail assembly and the second casing in FIG. 5 along a line B-B, and the cross section is a horizontal cross section parallel to an X-Y plane. Referring to FIG. 5 and FIG. 6 at the same time, the slide rail assembly 100a may also be disposed on the second casing 300. A difference between the second casing 300 and the first casing 200 is that a length L4 of the second casing 300 in the sliding direction (X-axis) is smaller than the distance L2 between the first end 122 of the inner slide rail 120 and the second hook 132a of the first engaging component 130a.

In addition, as shown in the enlarged views of FIG. 3 and FIG. 5, a difference between the slide rail assembly 100a fixed on the second casing 300 and the slide rail assembly 100a fixed on the first casing 200 (FIG. 3) is that in the embodiment of FIG. 5, the first engaging component 130a does not pivot relative to the inner slide rail 120, but only be partially overlapped with the critical positioning slot 128.

As shown in FIG. 5, when the second casing 300 is fixed on the inner slide rail 120, a plurality of second fixing portions 320 configured on a second side surface 310 of the second casing 300 may be engaged with a corresponding number of the positioning slots 126 of the inner slide rail 120, so that the second casing 300 is fixed to the inner slide rail 120. Since the length L4 of the second casing 300 is relatively short, the second fixing portion 320 will not protrude into the critical positioning slot 128 so that the second hook 132a is located on the engaging path S with the first hook 112 (FIG. 6).

When the second casing 300 sliding out of the chassis 400 (FIG. 1) along the sliding direction (+X-axis direction), the second casing 300 and the inner slide rail 120 may slide relative to the outer slide rail 110 until the second hook 132*a* of the inner slide rail 120 engages with the first hook 112 of the outer slide rail 110. In the embodiment, the second hook 132*a* may limit a sliding stroke of the second casing 300 and the inner sliding rail 120 along the sliding direction (X-axis). The sliding stroke may be the distance L2.

Since the length L4 of the second casing 300 is less than the distance L2 (FIG. 5), when the second hook 132*a* is engaged with the first hook 112, the second casing 300 may completely slide out of the chassis 400 (FIG. 1) to facilitate replacement and maintenance.

When the second casing 300 and the inner slide rail 120 are to be completely taken out from the chassis 400 (FIG. 1), the first engaging component 130*a* and the second engaging component 140*a* may be pushed and pivoted relative to the inner slide rail 120. At this time, the second hook 132*a* and the third hook 142*a* leave the engaging path S with the first hook 112, and the inner slide rail 120 may be detached from the outer slide rail 110.

According to the above descriptions, the same slide rail assembly 100*a* of the embodiment is applicable to casings of different sizes (for example, the first casing 200 and the second casing 300), which may reduce material preparation cost and storage cost of the slide rail assembly 100*a*. Through the arrangement of the critical positioning slot 128 of the inner slide rail 120 and the first engaging component 130*a*, when the slide rail assembly 100*a* is disposed on a longer casing (the first casing 200 shown in FIG. 3), the slide rail assembly 100*a* may have structural interference with the first casing 200. The user may misalign the second hook 132*a* and the first hook 112 without manually adjusting the slide rail assembly 100*a*, so that the slide rail assembly 100*a* has a longer sliding stroke (the distance L3 shown in FIG. 3).

When the slide rail assembly 100*a* is disposed on a shorter casing (the second casing 300 as shown in FIG. 5), the second hook 132*a* is aligned with the first hook 112, and the slide rail assembly 100*a* has a relatively short sliding stroke (the distance L2 shown in FIG. 5). In this way, the slide rail assembly 100*a* is adapted to casings of various sizes (for example, the first casing 200 and the second casing 300), which improves the usage convenience of the slide rail assembly 100*a*.

It should be noted that, as shown in FIG. 1, one slide rail assembly 100*a* is respectively configured on each side of the first casing 200/second casing 300 of the embodiment, but the disclosure is not limited thereto. In an embodiment that is not shown, the user may only configure the slide rail assembly 100*a* on one side of the first casing 200/second casing 300, and the other side of the first casing 200/second casing 300 may be configured with a slide rail without the above-mentioned first engaging component and second engaging component. Through the slide rail assembly 100*a* provided on one side, the above-mentioned effect of changing the pulling-out distance according to different casing lengths may still be achieved.

Certainly, the connection manner between the first engaging component and the second engaging component and the inner slide rail 120 and the structures of the first engaging component and the second engaging component are not limited to that described in the aforementioned embodiments.

Figure 7A:
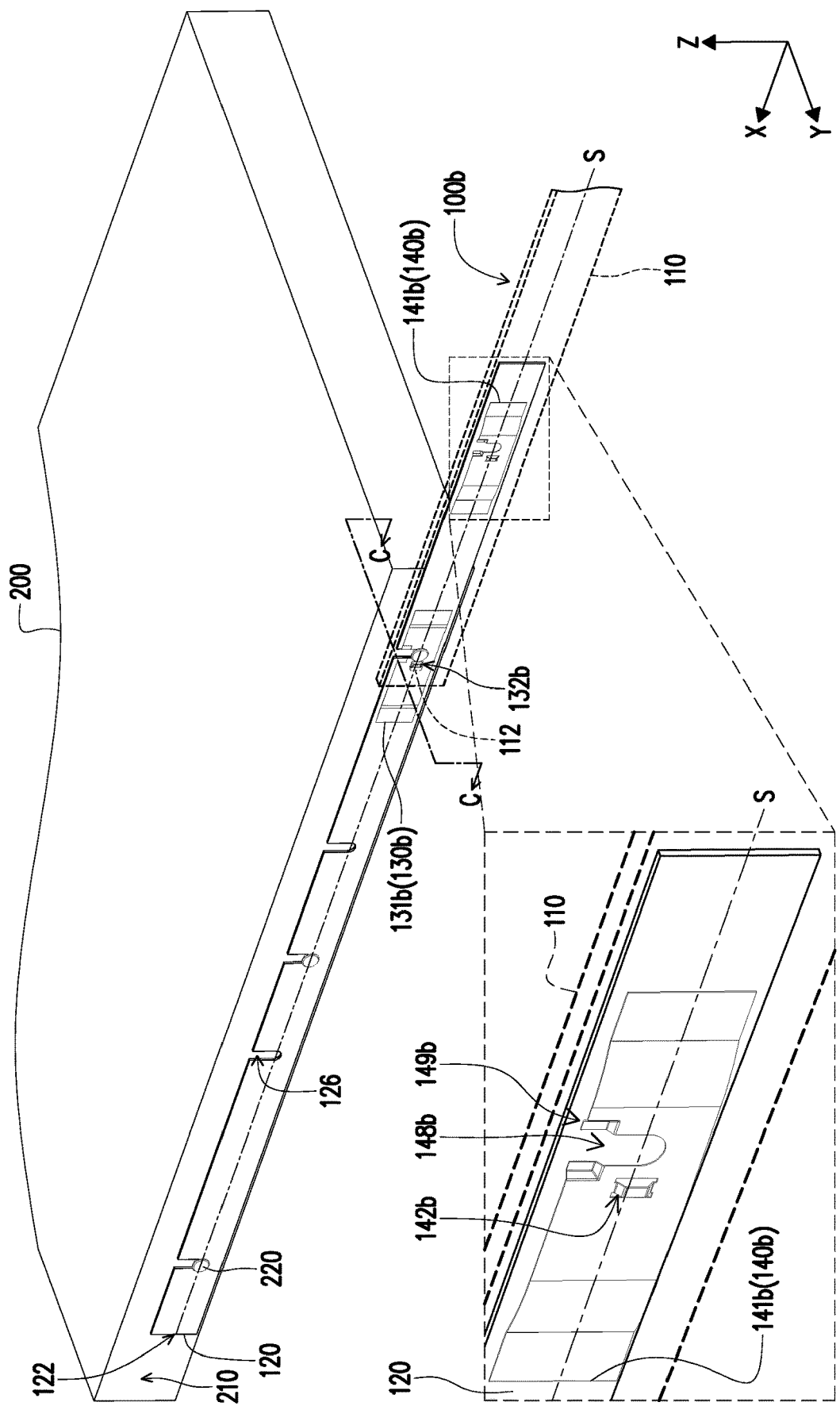
FIG. 7A is a schematic diagram after a slide rail assembly and a first casing are assembled according to another embodiment of the disclosure.
Figure 7B:
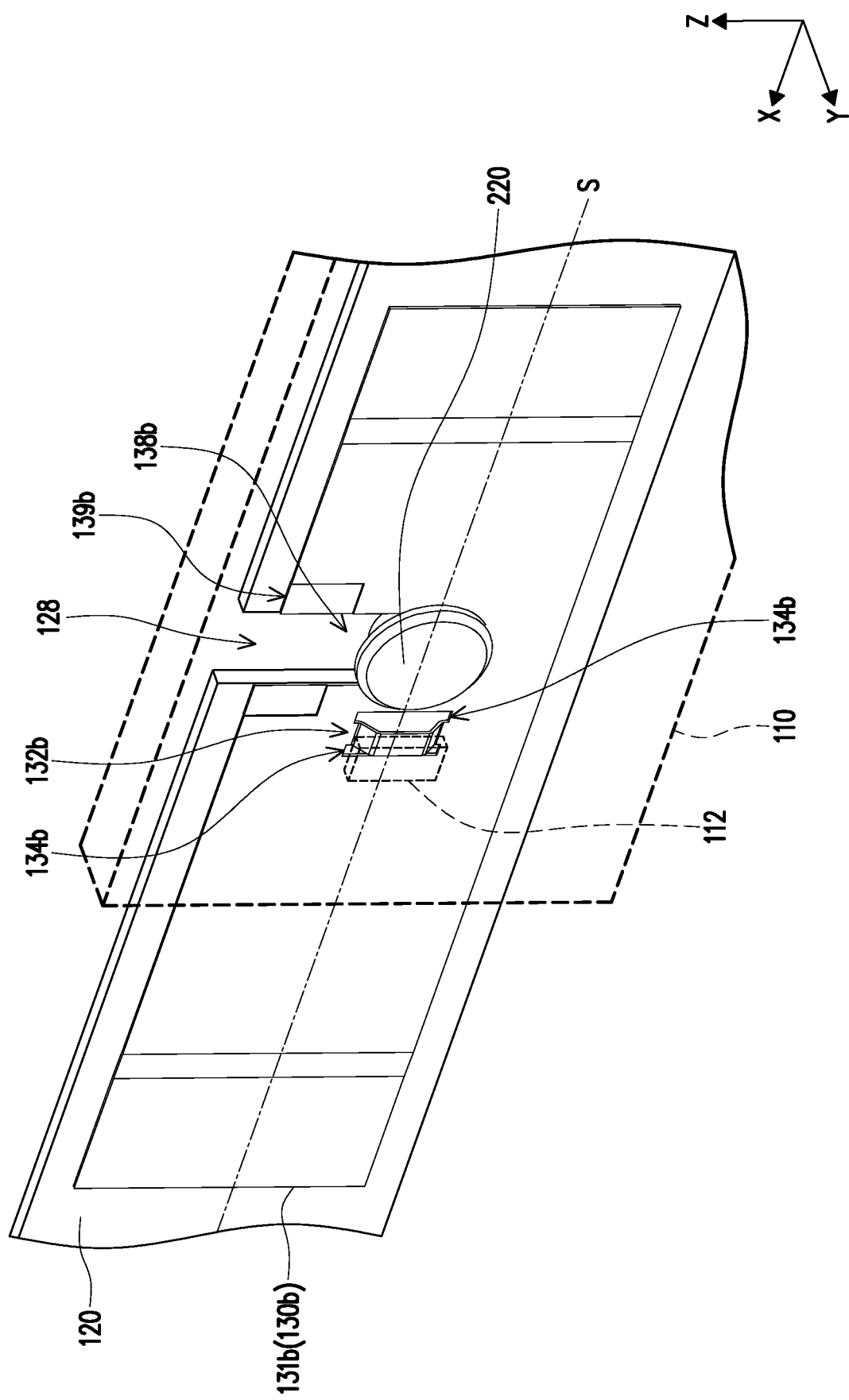
FIG. 7B is a partial enlarged view of a first engaging component of FIG. 7A.
Figure 8:
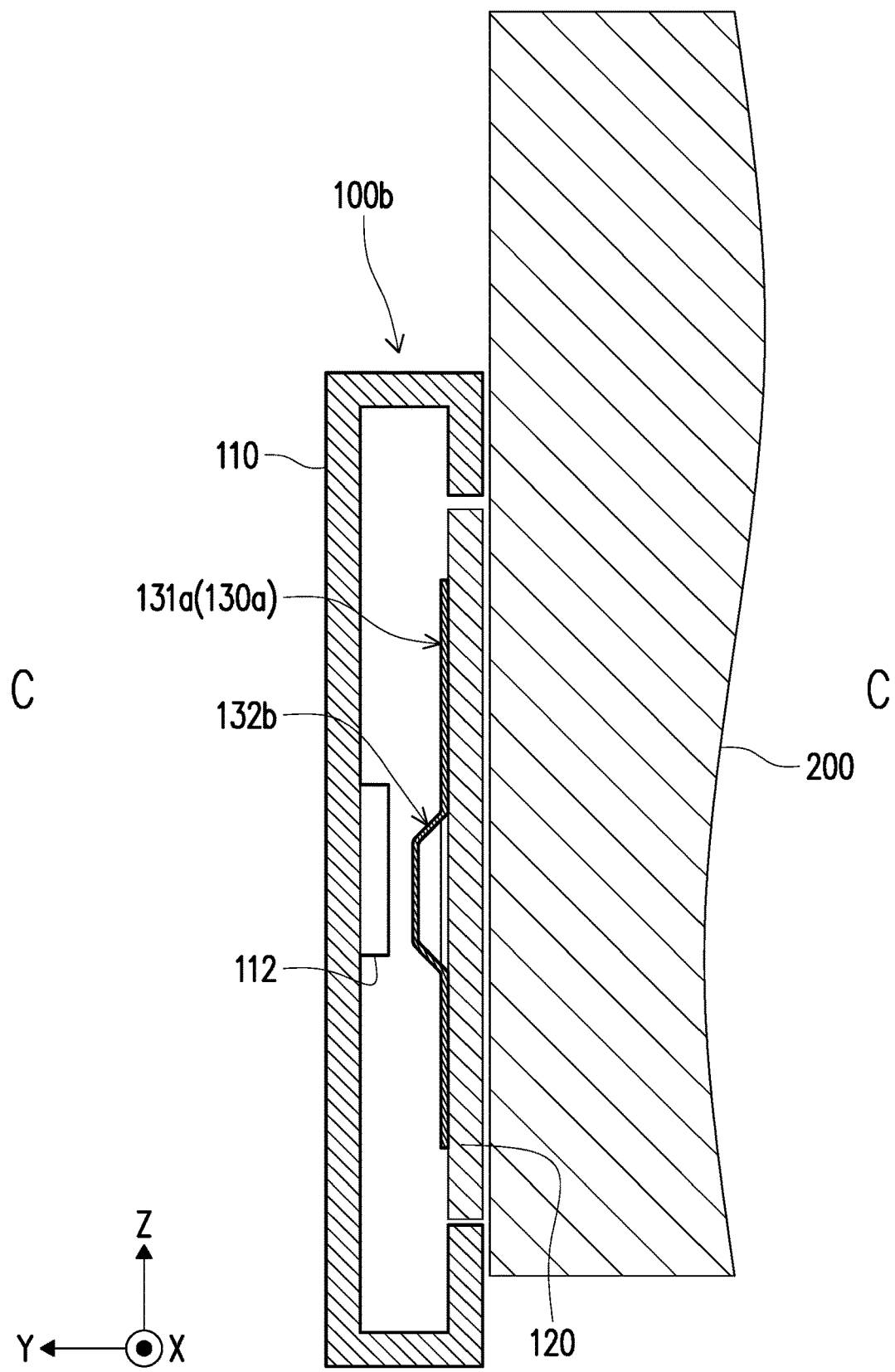
FIG. 8 is a cross-sectional view of the slide rail assembly and the first casing of FIG. 7A along a line C-C.

FIG. 7A is a schematic diagram after a slide rail assembly and a first casing are assembled according to another embodiment of the disclosure. FIG. 7B is a partial enlarged view of a first engaging component of FIG. 7A. The outer slide rail 110 of FIG. 7A and FIG. 7B is shown in a perspective manner. FIG. 8 is a cross-sectional view of the slide rail assembly and the first casing of FIG. 7A along a line C-C, and the cross section is a straight cross section parallel to the Y-Z plane.

Referring to FIG. 3, FIG. 7A to FIG. 8 at the same time, a first engaging component 130*b* and a second engaging component 140*b* of the embodiment are similar to that of the previous embodiment, and a difference therebetween is that the first engaging component 130*b* of a slide rail assembly 100*b* of FIG. 7A to FIG. 8 includes a first elastic piece 131*b*, and the second engaging component 140*b* includes a second elastic piece 141*b*. The first engaging component 130*b* and the second engaging component 140*b* have similar structures.

As shown in the enlarged view of FIG. 7A, the second elastic piece 141*b* may move close to or away from the inner slide rail 120, and the third hook 142*b* is disposed on the second elastic piece 141*b*. The second elastic piece 141*b* includes a second groove 148*b* and a bending portion 149*b* located beside the second groove 148*b*. The bending portion 149*b* is located at an opening of the second groove 148*b*. The bending portion 149*b* is bent toward the inner sliding rail 120 (i.e., the —Y-axis direction) on the second elastic piece 141*b*.

When the slide rail assembly 100*b* is not disposed in the casing (the first casing 200 or the second casing 300), configuration of the bending portion 149*b* may ensure that the second elastic piece 141*b* is at a certain distance from the inner slide rail 120 in the Y-axis direction, so that a second hook 132*b* is located on the engaging path S with the first hook 112. The bending portion 149*b* of the embodiment does not contact the inner slide rail 120, but the disclosure is not limited thereto.

Similarly, the first elastic piece 131*b* may move close to or away from the inner sliding rail 120, and the second hook 132*b* is disposed at the first elastic piece 131*b*. The first elastic piece 131*b* includes two slots 134*b*, and a portion of the first elastic piece 131*b* between the two slots 134*b* is bent to form the second hook 132*b*. In other words, the first elastic piece 131*b* and the second hook 132*b* are integrally formed. The first elastic piece 131*b* includes a first groove 138*b* corresponding to the critical positioning slot 128 and a bending portion 139*b* bent toward the inner slide rail 120 (−Y-axis direction). The bending portion 139*b* is located at an opening of the first groove 138*b*.

As shown in FIG. 7A and FIG. 7B, when the first casing 200 is assembled on the inner slide rail 120, the first fixing portion 220 of the first casing 200 that is aligned with the critical positioning slot 128 is engaged with the critical positioning slot 128 and the first groove 138*b*, so that the first elastic piece 131*b* moves close to the inner slide rail 120.

In detail, as shown in FIG. 7B, when the first casing 200 is assembled on the inner slide rail 120, the first fixing portion 220 enters the critical positioning slot 128 from the opening of the critical positioning slot 128, and the bending portion 139*b* of the first elastic piece 131*b* is pulled by the first fixing portion 220, so that the bending portion 139*b* deforms toward the inner slide rail 120 and abuts against the inner slide rail 120. At this time, the second hook 132*b* leaves the engaging path S with the first hook 112. As shown in FIG. 8, the second hook 132*b* is located on a left side of the first hook 112 in the Y-axis direction without contacting the first hook 112, and the third hook 142b is located on the engaging path S with the first hook 112 (FIG. 8).

Therefore, when the first casing 200 and the inner slide rail 120 slide out of the chassis 400 (FIG. 1) along the sliding direction (+X-axis direction), the second hook 132b slides through the first hook 112, and the first hook 112 is engaged with the third hook 142b.

When the first casing 200 and the inner slide rail 120 are to be taken out from the chassis 400, the second elastic piece 141b may be deformed to approach or abut against the inner slide rail 120 until the third hook 142b leaves the engaging path S with the first hook 112. At this time, the inner slide rail 120 may be separated from the outer slide rail 110. The slide rail assembly 100b of the embodiment has the same functions as that of the above-mentioned embodiment.

In addition, the first elastic piece 131b and the second elastic piece 141b may not include the bending portions 139b, 149b. When the slide rail assembly 100b is assembled to the first casing 200, the user may manually press the first elastic piece 131b so that the first elastic piece 131b is close to the inner slide rail 120. The first fixing portion 220 of the first casing 200 enters into the critical positioning slot 128 and the first groove 138b, so as to position the first elastic piece 131b to be close to the inner slide rail 120, so that the second hook 132b leaves the engaging path S with the first hook 112 (FIG. 8).

Figure 9:
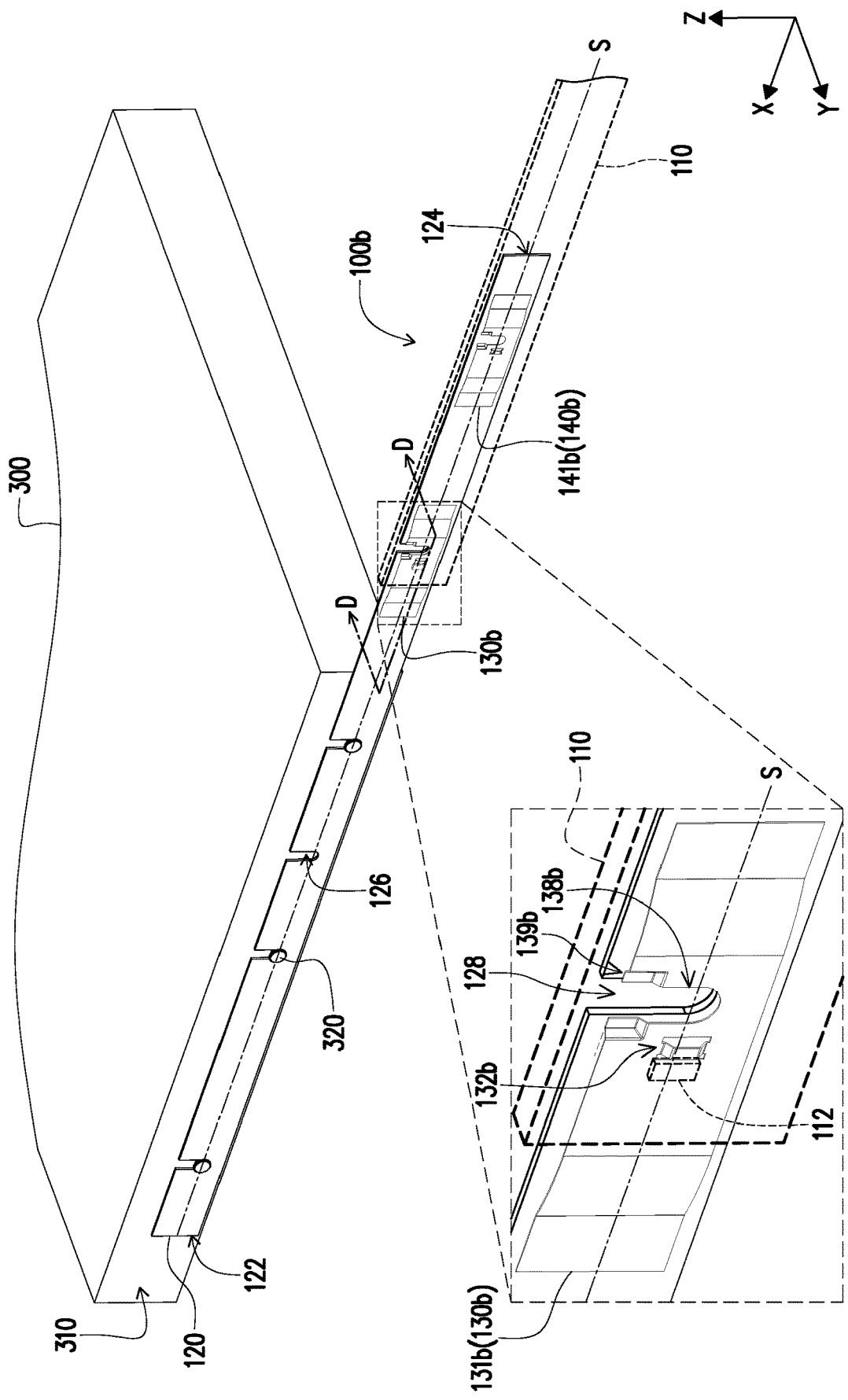
FIG. 9 is a schematic diagram after the slide rail assembly of FIG. 7A is assembled with the second casing.
Figure 10:
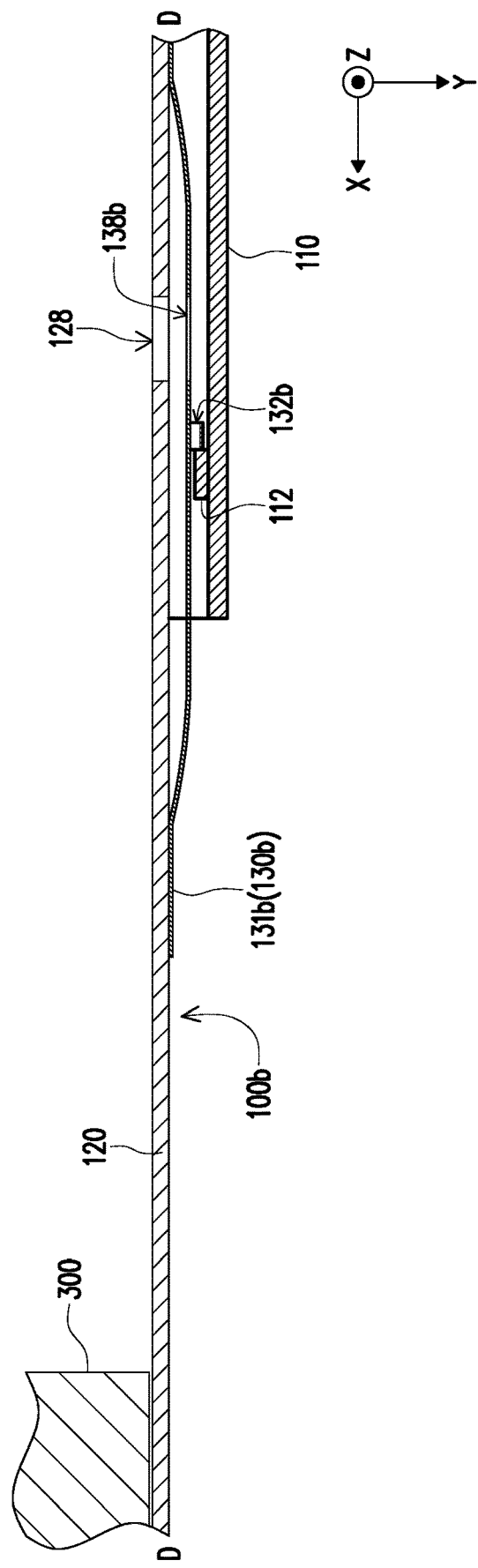
FIG. 10 is a cross-sectional view of the slide rail assembly and the second casing in FIG. 9 along a line D-D.

FIG. 9 is a schematic diagram after the slide rail assembly of FIG. 7A is assembled with the second casing, and the outer slide rail 110 is presented in a perspective manner. FIG. 10 is a cross-sectional view of the slide rail assembly and the second casing in FIG. 9 along a line D-D, and the cross section is a horizontal cross section parallel to the X-Y plane. Referring to FIG. 9 and FIG. 10 at the same time, when the second casing 300 is fixed to the inner slide rail 120, the second fixing portions 320 are not engaged with the critical positioning slot 128 and the first groove 138b of the first engaging component 130b, so that the second hook 132b is still located on the engaging path S with the first hook 112 (FIG. 10).

When the second casing 300 and the inner sliding rail 120 slide out of the chassis 400 (FIG. 1) along the sliding direction (+X-axis direction), the second hook 132b may be engaged with the first hook 112. When the second casing 300 and the inner slide rail 120 are to be taken out from the chassis 400 (FIG. 1), the first elastic piece 131b and the second elastic piece 141b may be deformed to approach or abut against the inner slide rail 120, so that the second hook 132b and the third hook 142b leave the engaging path S with the first hook 112 (FIG. 10). At this time, the inner slide rail 120 may be separated from the outer slide rail 110.

In summary, the slide rail assembly of the disclosure may make the second hook of the first engaging component to automatically misalign with the first hook through the structural interference of the critical positioning slot of the inner slide rail and the first engaging component with the first fixing portion of the first casing, so that the first hook is engaged with the third hook. The first casing and the inner slide rail may have a longer sliding stroke. In addition, when the slide rail assembly is disposed on a shorter casing (for example, the second casing), the second hook is not misaligned with the first hook so that the first hook engages with the second hook. At this time, the second casing and the inner slide rail may have a shorter sliding stroke. Therefore, the slide rail assembly is suitable for casings of various sizes, and the inner slide rail may have different sliding lengths according to different casing sizes, so as to improve usage convenience of the slide rail assembly and reduce the cost.

What is claimed is:

1. A slide rail assembly, adapted to be disposed on a first side surface of a first casing, wherein the first side surface of the first casing is configured with a plurality of first fixing portions, and the slide rail assembly comprises:
   an outer slide rail, comprising a first hook;
   an inner slide rail, slidably disposed on the outer slide rail along a sliding direction, and comprising a first end, a second end, and a plurality of positioning slots located between the first end and the second end, wherein the first fixing portions are adapted to be engaged with a corresponding number of the positioning slots, so that the first casing is fixed to the inner slide rail;
   a first engaging component, movably disposed on the inner slide rail, and being partially overlapped with a critical positioning slot closest to the second end in the positioning slots, wherein the first engaging component comprises a second hook;
   a second engaging component, movably disposed on the inner slide rail and close to the second end, wherein the second engaging component comprises a third hook,
   when the first casing is assembled on the inner slide rail, one of the first fixing portions of the first casing that is aligned with the critical positioning slot pushes against the first engaging component, so that the second hook leaves an engaging path with the first hook, and the first casing and the inner slide rail are adapted to slide relative to the outer slide rail to a position the third hook is engaged with the first hook.

2. The slide rail assembly according to claim 1, wherein a length of the first casing in the sliding direction is greater than a distance between the first end and the first engaging component and smaller than a distance between the first end and the second engaging component.

3. The slide rail assembly according to claim 1, wherein a projection of an end of the first casing in the sliding direction on the inner slide rail is located between a projection of the second hook on the inner slide rail and a projection of the third hook on the inner slide rail.

4. The slide rail assembly according to claim 1, wherein the slide rail assembly is adapted to be disposed on a second casing, a second side surface of the second casing is configured with a plurality of second fixing portions, and the second fixing portions are adapted to be engaged with a corresponding number of the positioning slots, so that the second casing is fixed to the inner slide rail, when the second casing is fixed to the inner slide rail, the second hook is located on the engaging path with the first hook, and the second casing and the inner slide rail are adapted to slide relative to the outer slide rail to a position the second hook engages with the first hook.

5. The slide rail assembly according to claim 4, wherein a length of the second casing in the sliding direction is smaller than a distance between the first end and the first engaging component.

6. The slide rail assembly according to claim 4, wherein when the second casing is fixed to the inner slide rail, the first engaging component is adapted to be pushed against, and the second hook leaves the engaging path with the first hook, so that the inner slide rail is adapted to be detached from the outer slide rail.

7. The slide rail assembly according to claim 1, wherein the first engaging component comprises a first main body pivotally connected to the inner slide rail, and the second hook is disposed on the first main body.

8. The slide rail assembly according to claim 1, wherein the first engaging component further comprises a first elastic piece, the first elastic piece is adapted to move close to or away from the inner slide rail, the second hook is disposed on the first elastic piece, and the first elastic piece comprises a first groove corresponding to the critical positioning slot, when the first casing is fixed to the inner slide rail, the one of the first fixing portions of the first casing that is aligned with the critical positioning slot engages with the critical positioning slot and the first groove, such that the first elastic piece moves close to the inner slide rail, and the second hook leaves the engaging path with the first hook.

9. The slide rail assembly according to claim 8, wherein the first elastic piece has a bending portion bent towards the inner slide rail, and the bending portion is located at an opening of the first groove.

10. The slide rail assembly according to claim 9, wherein in a process of fixing the first casing to the inner slide rail, the one of the first fixing portions that is aligned with the critical positioning slot enters the critical positioning slot, so that the bending portion of the first elastic piece deforms toward the inner slide rail and abuts against the inner slide rail, and the second hook leaves the engaging path with the first hook.

* * * * *